United States Patent
Saito et al.

(10) Patent No.: US 9,001,247 B2
(45) Date of Patent: Apr. 7, 2015

(54) IMAGING SYSTEM AND METHOD FOR DRIVING IMAGING SYSTEM

(71) Applicant: Canon Kabushiki Kaisha, Tokyo (JP)

(72) Inventors: Kazuhiro Saito, Tokyo (JP); Yasushi Matsuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/044,172

(22) Filed: Oct. 2, 2013

(65) Prior Publication Data

US 2014/0098269 A1 Apr. 10, 2014

(30) Foreign Application Priority Data

Oct. 5, 2012 (JP) ................. 2012-223313

(51) Int. Cl.
| | |
|---|---|
| H04N 3/14 | (2006.01) |
| H04N 5/335 | (2011.01) |
| H04N 5/363 | (2011.01) |
| H04N 5/347 | (2011.01) |
| H04N 5/357 | (2011.01) |
| H04N 5/378 | (2011.01) |

(52) U.S. Cl.
CPC .............. *H04N 5/363* (2013.01); *H04N 5/347* (2013.01); *H04N 5/3575* (2013.01); *H04N 5/378* (2013.01)

(58) Field of Classification Search
CPC ..... H04N 5/378; H04N 5/3575; H04N 5/357; H04N 5/363; H04N 5/3658; H04N 5/37457; H04N 5/347
USPC ................................................. 348/294–324
See application file for complete search history.

(56) References Cited

U.S. PATENT DOCUMENTS

| | | | | |
|---|---|---|---|---|
| 6,781,627 | B1* | 8/2004 | Takayanagi | 348/308 |
| 7,782,383 | B2* | 8/2010 | Olsen et al. | 348/309 |
| 7,812,876 | B2* | 10/2010 | Hiyama et al. | 348/300 |
| 7,847,231 | B2* | 12/2010 | Hirose | 250/208.1 |
| 2005/0068439 | A1* | 3/2005 | Kozlowski et al. | 348/308 |
| 2005/0168602 | A1* | 8/2005 | Sumi et al. | 348/294 |
| 2006/0187329 | A1* | 8/2006 | Panicacci | 348/308 |
| 2007/0007438 | A1* | 1/2007 | Liu et al. | 250/214 AG |
| 2007/0279507 | A1* | 12/2007 | Anthony | 348/308 |
| 2008/0012976 | A1* | 1/2008 | Sakurai et al. | 348/301 |
| 2008/0062295 | A1* | 3/2008 | Fujimura et al. | 348/301 |
| 2008/0252764 | A1* | 10/2008 | Shinohara | 348/308 |
| 2008/0258047 | A1* | 10/2008 | Sakakibara et al. | 250/214 |
| 2009/0091648 | A1* | 4/2009 | Lin et al. | 348/301 |
| 2009/0309033 | A1* | 12/2009 | Cho | 250/370.08 |
| 2009/0322903 | A1* | 12/2009 | Hashimoto et al. | 348/229.1 |

(Continued)

FOREIGN PATENT DOCUMENTS

JP 2008-078894 A 4/2008

*Primary Examiner* — Chia-Wei A Chen
(74) *Attorney, Agent, or Firm* — Canon USA Inc IP Division (57) ABSTRACT

A method drives an imaging system including: a plurality of pixels; an amplifier having an input node connected to the plurality of pixels via an input capacitor, and an output node connected to the input node via a feedback capacitor; and a reset unit configured to reset the input node to a base potential. The method includes the steps of: causing the input capacitor to hold noise output from one of the plurality of pixels; adding signals output from the two or more pixels in the feedback capacitor; and obtaining a difference between a signal applying a gain to a base signal output from the amplifier according to the reset of the input node of the amplifier and the signal added in the feedback capacitor.

9 Claims, 11 Drawing Sheets

(56) References Cited

U.S. PATENT DOCUMENTS

| | | |
|---|---|---|
| 2010/0079648 A1* | 4/2010 | Totsuka et al. ............... 348/308 |
| 2010/0097501 A1* | 4/2010 | Fowler ......................... 348/241 |
| 2010/0149385 A1* | 6/2010 | Tay .............................. 348/241 |
| 2010/0157035 A1* | 6/2010 | Purcell et al. .................. 348/65 |
| 2010/0182468 A1* | 7/2010 | Posch et al. .................. 348/294 |
| 2010/0194949 A1* | 8/2010 | Hisamatsu .................... 348/302 |
| 2010/0265373 A1* | 10/2010 | Tejada et al. ................. 348/297 |
| 2011/0058082 A1* | 3/2011 | Tay .............................. 348/308 |
| 2011/0205398 A1* | 8/2011 | Hatano ..................... 348/231.99 |
| 2011/0285893 A1* | 11/2011 | Sakai ........................... 348/324 |
| 2012/0320246 A1* | 12/2012 | Ikuma et al. .................. 348/300 |

* cited by examiner

IMAGING SYSTEM AND METHOD FOR DRIVING IMAGING SYSTEM

BACKGROUND

1. Technical Field

The present disclosure relates to an imaging system and a method for driving the imaging system.

2. Description of the Related Art

Addition of signals from a plurality of pixels is known in an application requiring high-speed signal reading such as a moving image. A photoelectric conversion apparatus having an amplifier in each column pixels provided in a matrix and configured to add a signal in a feedback capacitor included in the amplifier has been discussed in Japanese Patent Application Laid-Open No. 2008-78894.

The amplifier discussed in Japanese Patent Application Laid-Open No. 2008-78894 includes a clamp capacitor. The amplifier clamps signals output in response to the reset of the pixel to the clamp capacitor, and then sequentially adds signals output in response to photoelectric conversion. When the above-described clamp operation is performed, an input node of the amplifier is reset to a base potential. The output of the amplifier at this time includes an offset component resulting from the amplifier. Thereafter, a difference between the offset component and the signals after addition is obtained.

According to the operation of the photoelectric conversion apparatus discussed in Japanese Patent Application Laid-Open No. 2008-78894, in a process in which signals output from n (n is an integer of 2 or more) pixels are sequentially added, a level according to the reset of a first pixel is clamped with the clamp capacitor, and the signals from the n pixels are then added. More specifically, the signals from the n pixels are added while only a signal from one pixel is clamped.

For this reason, since the (n−1) offset components remain in the operation discussed in Japanese Patent Application Laid-Open No. 2008-78894, there is a concern that an S/N ratio of the signal output from the photoelectric conversion apparatus may be decreased.

SUMMARY

According to an aspect of the present disclosure, an imaging system includes a plurality of pixels, an amplifier having an input node connected to the plurality of pixels via an input capacitor, and an output node connected to the input node via a feedback capacitor, and a reset unit configured to reset the input node to a base potential, wherein the imaging system is capable of operating in an addition mode adding signals from the plurality of pixels in the feedback capacitor, the imaging system further comprises a signal level adjusting unit, the amplifier holds noise output from one of the plurality of pixels in the input capacitor in the addition mode, and thereafter adds the signals output from the two or more pixels in the feedback capacitor, and the signal level adjusting unit obtains a difference between a signal applying a gain to a base signal output from the amplifier according to the reset of the input node of the amplifier by the reset unit and the signal added in the feedback capacitor.

According to another aspect of the present disclosure, a method for driving an imaging system including a plurality of pixels and an amplifier having an input node connected to the plurality of pixels via an input capacitor, and an output node connected to the input node via a feedback capacitor, the method includes causing the input capacitor to hold base signal output from one of the plurality of pixels, adding signals output from the two or more pixels of the plurality of pixels in the feedback capacitor, and obtaining a difference between a signal applying a gain to a base signal output from the amplifier according to the reset of the input node of the amplifier to a base potential and a signal added in the feedback capacitor.

Further features and aspects of the present disclosure will become apparent from the following description of embodiments with reference to the attached drawings.

DESCRIPTION OF THE EMBODIMENTS

A first embodiment will be described.

Figure 1:
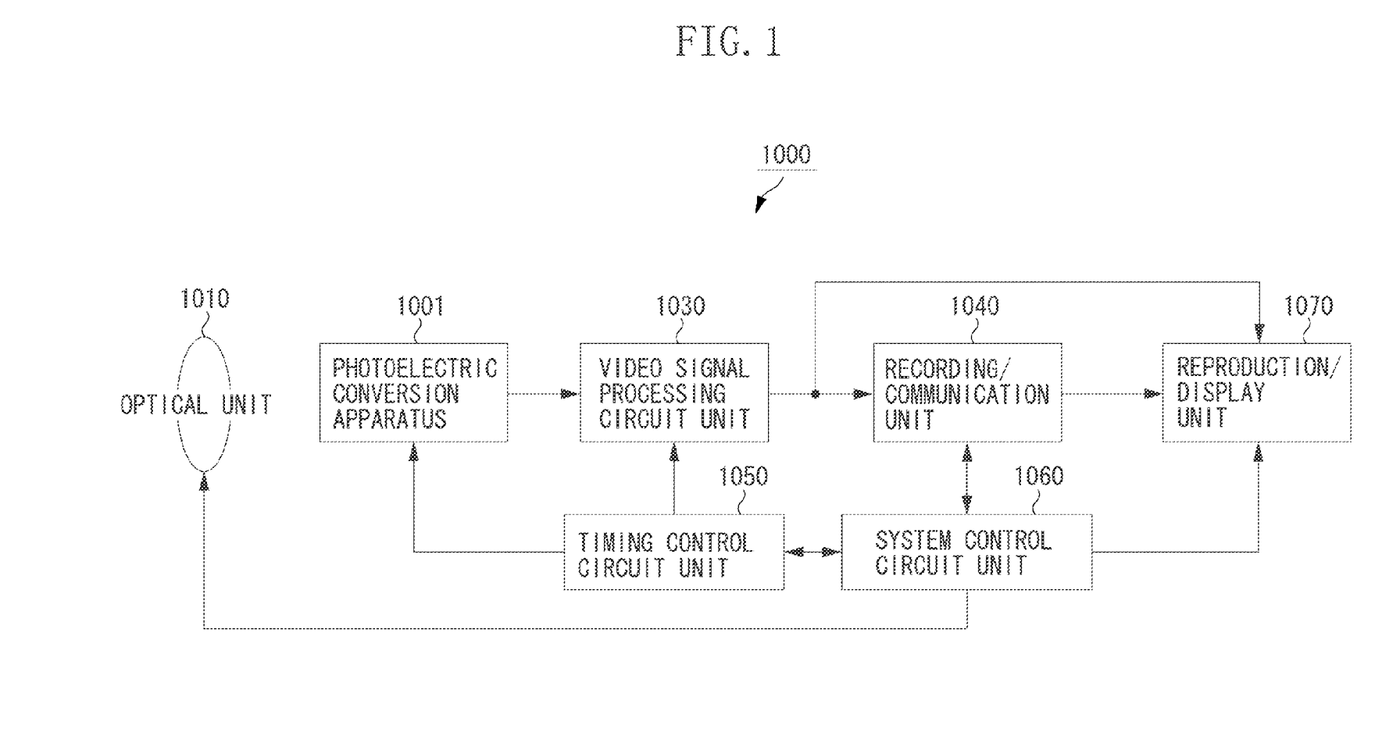
FIG. 1 illustrates a configuration of an imaging system according to an embodiment.

An imaging system according to a first embodiment will be described with reference to FIG. 1. An imaging system 1000 includes an optical unit 1010, a photoelectric conversion apparatus 1001, a video signal processing circuit unit 1030, a recording/communication unit 1040, a timing control circuit unit 1050, a system control circuit unit 1060, and a reproduction/display unit 1070, for example. The imaging system 1000 is configured to be operated in at least an addition mode and a non-addition mode which will be described later. The imaging system 1000 is configured to switch between the addition mode and the non-addition mode.

The optical unit 1010 which is an optical system such as a lens that forms an image of light from an object on a pixel array in which a plurality of pixels are aligned two-dimensionally of the photoelectric conversion apparatus 1001 and forms an image of the object. The photoelectric conversion apparatus 1001 outputs a signal according to the light formed on the pixel array at a timing on the basis of a signal from the timing control circuit unit 1050.

The signal output from the photoelectric conversion apparatus 1001 is input to the video signal processing circuit unit 1030 which is a video signal processing unit, and the video signal processing circuit unit 1030 performs processing such as correction on an input electric signal according to a method determined by a program. The signal resulting from processing by video signal processing circuit unit 1030 is transmitted to the recording/communication unit 1040 as image data. The recording/communication unit 1040 transmits the signal for forming an image to the reproduction/display unit 1070, and the reproduction/display unit 1070 is caused to reproduce/display a moving image or a still image. In response to a signal from the video signal processing circuit unit 1030, the recording/communication unit 1040 also communicates with the system control circuit unit 1060 and records a signal for forming an image on a recording medium, not illustrated.

The system control circuit unit 1060 comprehensively controls an operation of the imaging system and controls the driving of the optical unit 1010, timing control circuit unit 1050, recording/communication unit 1040, and reproduction/display unit 1070. The system control circuit unit 1060 further includes a storage device, not illustrated, which is a recording medium, for example, and a program required for controlling an operation of the imaging system is recorded therein. The system control circuit unit 1060 supplies a signal for switching an operation mode in accordance with an operation by a user, for example, within the imaging system. Specific examples include a change of a row to be read or to be reset, a change of the field angle with an electronic zoom, the shift of the field angle with electronic image stabilizing function.

The timing control circuit unit 1050 controls the driving timing for the photoelectric conversion apparatus 1001 and the video signal processing circuit unit 1030 under the control of the system control circuit unit 1060 which is a control unit.

Figure 2:
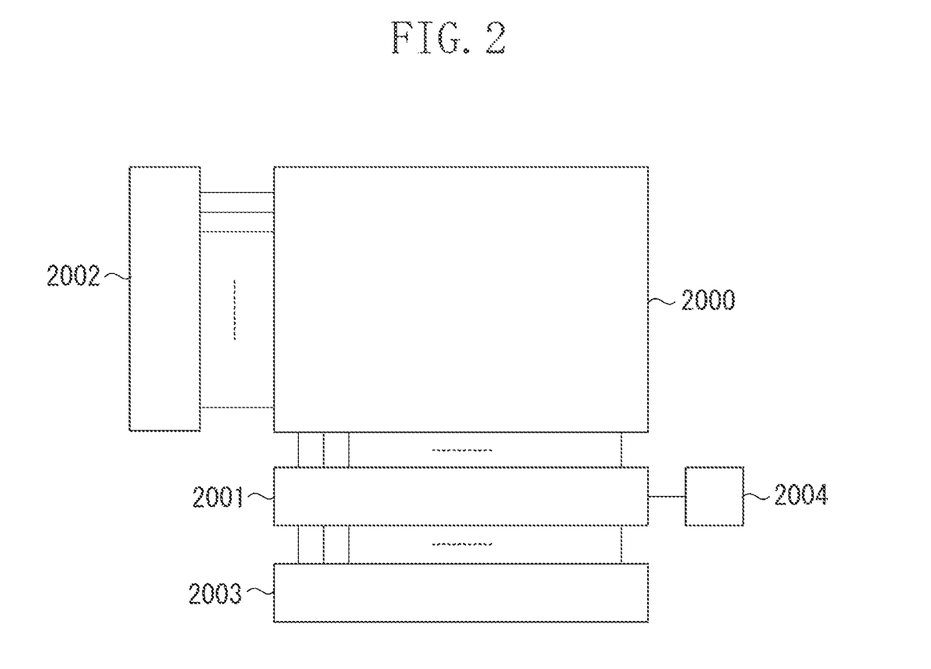
FIG. 2 illustrates a configuration of a photoelectric conversion apparatus according to an embodiment.

FIG. 2 is a block diagram illustrating the configuration of the photoelectric conversion apparatus 1001. The photoelectric conversion apparatus 1001 includes a pixel array 2000, a reading unit group 2001, a row selection unit 2002, a column selection unit 2003, and an output unit 2004.

The pixel array 2000 includes a plurality of pixels arranged in a matrix. The row selection unit 2002 selects the pixels included in the pixel array 2000 row by row, and controls such that pixel signals are output from the selected pixels. The reading unit group 2001 each includes a plurality of reading units provided corresponding to each of columns of the pixel array 2000. Each reading unit has a function of adding a pixel signal output from a pixel of the corresponding column. The column selection unit 2003 selectively outputs a signal to the output unit 2004 from the reading unit group 2001.

Figure 3:
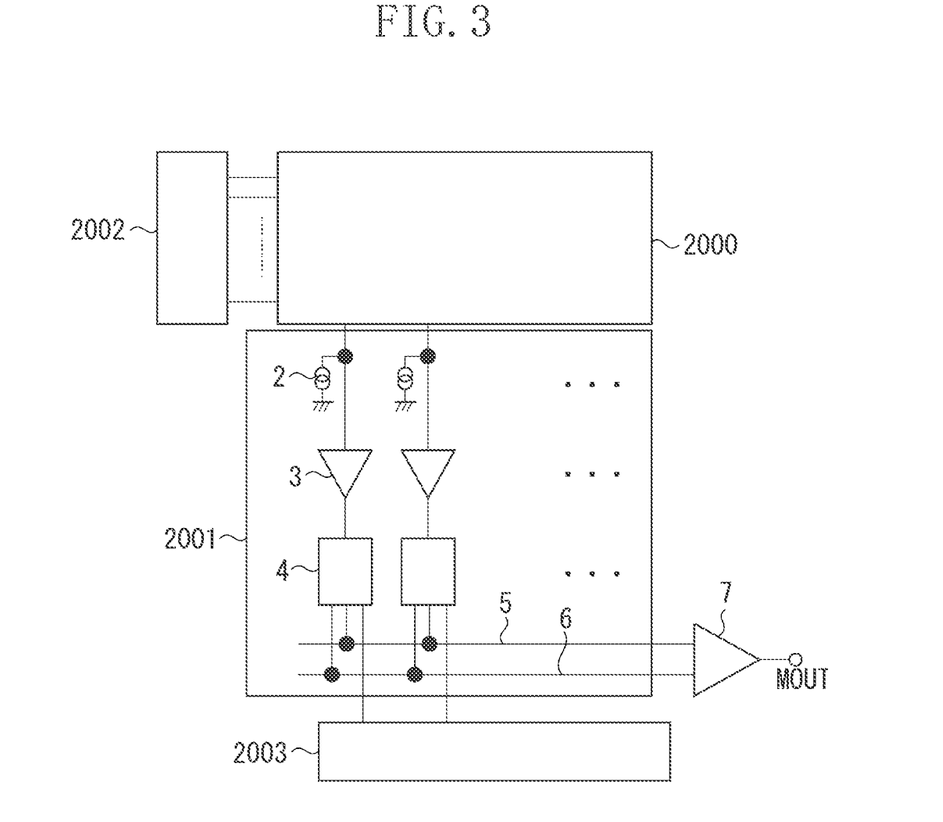
FIG. 3 illustrates a configuration of a photoelectric conversion apparatus according to an embodiment.

FIG. 3 illustrates configurations of the reading unit group 2001 and the output unit 2004 of the photoelectric conversion apparatus 1001 in detail. Configurations of reading units corresponding to two rows in the pixel array 2000 and the output unit 2004 are illustrated in detail. Herein, a case where the output unit 2004 includes a differential amplifier 7 is illustrated.

The reading unit provided to correspond to each column of the pixel array 2000 includes a constant-current source 2, a column amplification unit 3, and a signal holding unit 4. The constant-current source 2 supplies a current to the pixel, and constitutes a source follower circuit with an amplification transistor when the pixel includes the amplification transistor. The column amplification unit 3 is an amplification circuit having a feedback capacitor, and has a function of adding signals output from the plurality of pixels in the feedback capacitor. The signal holding unit 4 has a function of holding a signal including a signal including a noise component output from the amplification unit 3, and a component based on the noise component and the pixel signal. The two signals held by the signal holding unit 4 are applied to the differential amplifier 7 via signal lines 5 and 6, and a signal according to the difference between both the signals is output from an output terminal MOUT.

Figure 4:
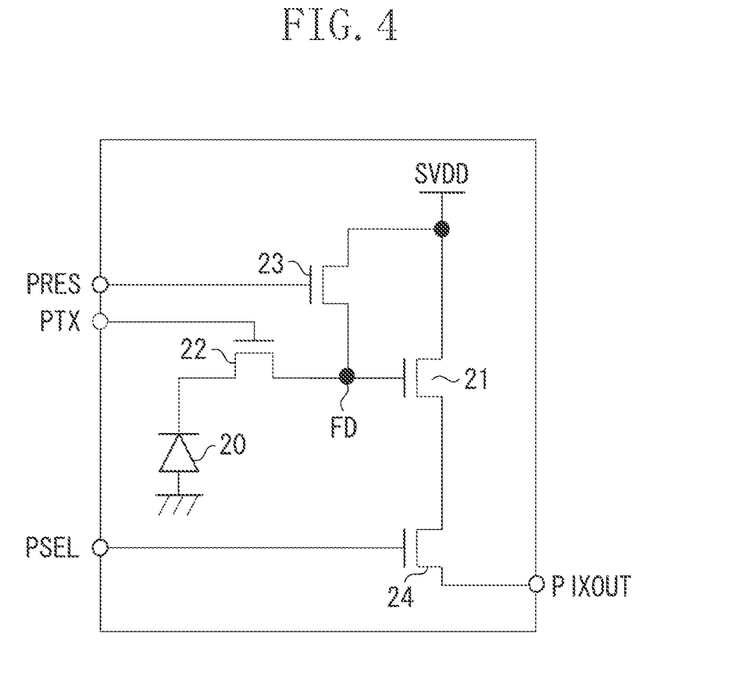
FIG. 4 illustrates a configuration of a photoelectric conversion apparatus according to an embodiment.

FIG. 4 illustrates a configuration of the pixel. A pixel pix includes a photo diode 20, an amplification transistor 21, a transfer transistor 22, a reset transistor 23, and selection transistor 24. The transfer transistor 22, the reset transistor 23, and the selection transistor 24 are switched to conductive state or non-conductive state by signals PTX, PRES, and PSEL. A ground potential is applied to an anode of the photo diode 20, and a cathode is connected to a floating diffusion portion FD via the transfer transistor 22. A gate of the amplification transistor 21 is connected to the floating diffusion unit FD, and is connected to a power supply SVDD via the reset transistor 23. One main node of the amplification transistor 21 is connected to the power supply SVDD, and the other main node is connected to an output node PIXOUT via the selection transistor 24.

Figure 5:
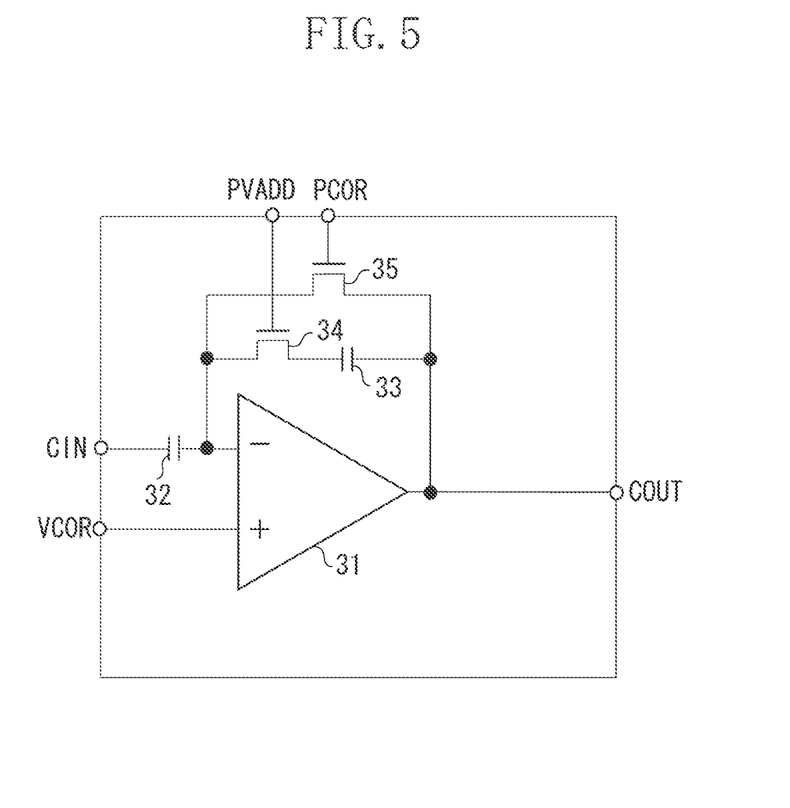
FIG. 5 illustrates a configuration of a photoelectric conversion apparatus according to an embodiment.

FIG. 5 illustrates a detailed configuration of the column amplification unit 3. The column amplification unit 3 includes a differential amplifier 31, an input capacitor 32, a feedback capacitor 33, an addition switch 34, and a column amplification unit reset switch 35. A base voltage VC0R is applied to a non-inversion input node of the differential amplifier 31. An inversion input node of the differential amplifier 31 is connected to one node of an input capacitor. The inversion input node of the differential amplifier 31 is connected to an output node of the differential amplifier 31 via a transistor which is the column amplification unit reset switch 35 or via a transistor which is the addition switch 34 and the feedback capacitor 33. The output node of the differential amplifier 31 is connected to an output node COUT of the column amplification unit 3. The other node of the input capacitor 32 is connected to the pixel via an input node CIN of the column amplification unit 3. The conductive state or non-conductive state of the addition switch 34 and column amplification unit reset switch 35 is switched by signals PVADD and PCOR. The column amplification unit reset switch 35 has a function as a reset unit configured to reset the input nodes of the differential amplifier 31 to a base potential.

Figure 6:
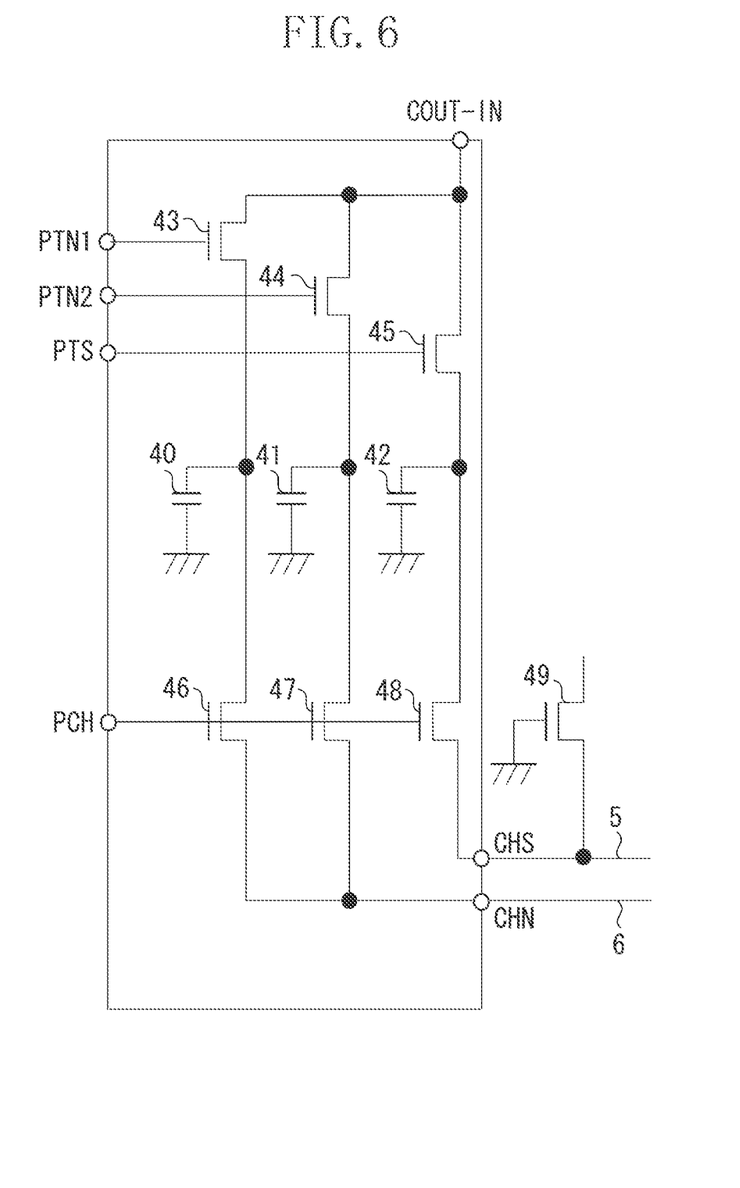
FIG. 6 illustrates a configuration of a photoelectric conversion apparatus according to an embodiment.

FIG. 6 illustrates a configuration of the signal holding unit 4. The signal holding unit 4 includes holding capacitors 40 to 42, holding switches 43 to 45, and horizontal transfer switches 46 to 48. Herein, an example in which the holding switches 43 to 45 and the horizontal transfer switches 46 to 48 are constituted by the transistors is illustrated. The conductive state or non-conductive state of the holding switches 43 to 45 is switched by signals PTN1, PTN2, and PTS. The conductive state or non-conductive state of the horizontal transfer switches 46 to 48 is switched by a signal PCH. The holding capacitors 40 to 42 are connected to an input node COUT-IN via the holding switches 43 to 45 corresponding to the holding capacitors 40 to 42. The input node COUT-IN is connected to the output node COUT of the column amplification unit 3 illustrated in FIG. 5. The holding capacitors 40 to 42 have a capacity equal to each other, and are connected to an output node CHN or CHS via the horizontal transfer switches 46 to 48 corresponding to the holding capacitors 40 to 42. The output node CHS is connected to a horizontal output line 5, and the output node CHN is connected to a horizontal output line 6. A dummy transistor 49 is connected to the horizontal output line 5. A ground potential is applied to a gate of the dummy transistor 49 so as not to operate the dummy transistor 49. The horizontal output lines 5 and 6 are connected to an input of the differential amplifier 7 illustrated in FIG. 3.

Figure 7:
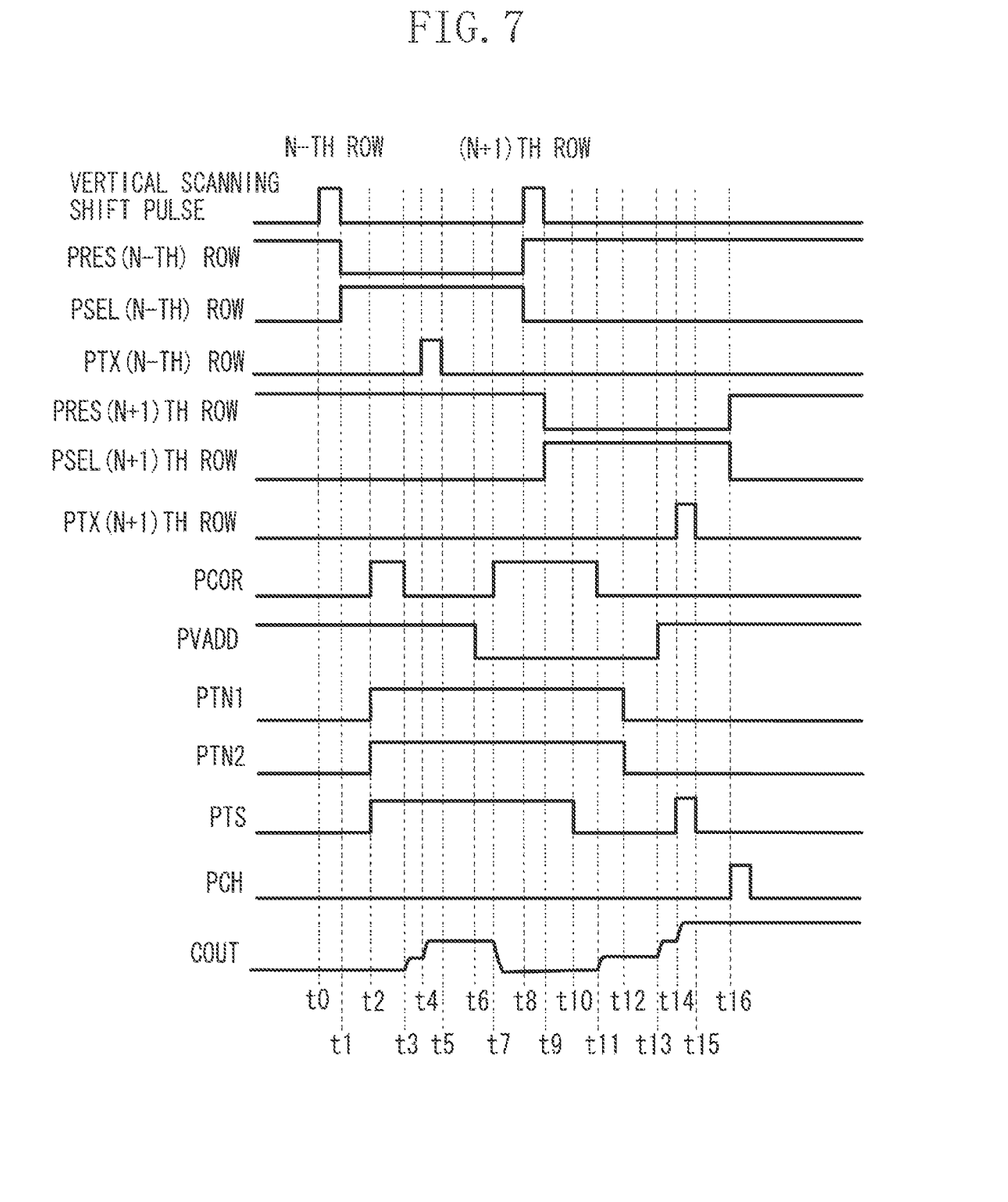
FIG. 7 is a timing diagram illustrating an operation in an addition mode of a photoelectric conversion apparatus according to an embodiment.

Next, the operation of the photoelectric conversion apparatus 1001 according to the present embodiment will be described with reference to FIG. 7 in addition to FIGS. 2 to 6.

An operation according to an operation mode (addition mode) adding pixel signals of n-th and (n+1)th rows will be described.

When a vertical scanning shift pulse is set to an H level at a time t0, the row selection unit 2002 starts control for reading a signal from a pixel of an n-th row.

Since the signal PRES is set to an H level at the time t0, the floating diffusion portion FD is in a reset state according to the power supply voltage SVDD. Since the signal PTX is set to an L level, electric charges generated according to photoelectric conversion by the photo diode 20 are accumulated in the photo diode 20. Since the signal PSEL is set to an L level, the signal is not output from the pixel.

The signal PVADD is set to an H level at the time t0, and the inversion input node of the differential amplifier 31 is connected to the output node of the differential amplifier 31 via the addition switch 34 and the feedback capacitor 33.

The signal PRES related to the pixel of the n-th row is set to an L level at the time t1, and the reset of the floating diffusion portion FD is released.

Similarly, the signal PSEL related to the pixel of the n-th row is set to an H level at the time t1, and the selection transistor 24 of the pixel of the n-th row is turned to a conductive state. Thereby, the source follower circuit is constituted by the amplification transistor 21 and the constant-current source 2, and the pixel signal is output from the pixel of the n-th row. A pixel signal according to the reset of the floating diffusion portion FD or the gate of the amplification transistor 21 is output from the pixel at this time, and includes noise.

The signal PCOR is set to an H level at a time t2, and the column amplification unit reset switch 35 is turned to a conductive state. Thereby, an output of the differential amplifier 31 is applied to one input node of the input capacitor 32, and both nodes of the feedback capacitor 33 are reset to an equal potential. Although this potential is ideally set to the base voltage VC0R by the differential amplifier 31 being substantially grounded, in fact, a noise signal VN1 by resetting the differential amplifier 31 is superimposed. Temporarily, an output level of the differential amplifier 31 at this time is set to VC0R+VN1.

Similarly, the signals PTN1, PTN2, and PTS are set to an H level at the time t2, and the output of the column amplification unit 3 is applied to the holding capacitors 40 to 42.

The signal PCOR is set to an L level at a time t3, and the column amplification unit reset switch 35 is brought into a non-conductive state. Thereby, a voltage of a difference between VC0R+VN1 and the pixel signal according to the reset of the floating diffusion portion FD of the pixel of the n-th row is held by the input capacitor 32. More specifically, the noise output from the pixel is held by the input capacitor 32. The output of the column amplification unit 3 varies by the noise signal VN1 based on the base voltage VC0R.

The signal PTX related to the pixel of the n-th row is set to an H level at a time t4 to a time t5, and the electric charges accumulated in the photo diode 20 are transferred to the floating diffusion portion FD. Thereby, the level of the pixel signal output from the pixel changes. The pixel signal at this time is set to a signal level obtained by superimposing a level according to an amount of electric charges transferred from the photo diode 20 on a level according to the reset of the floating diffusion portion FD.

The signal PVADD is set to an L level at a time t6. Thereby, the addition switch 34 is brought into a non-conductive state, and the feedback capacitor 33 is electrically cut from a feedback path. A voltage held by the feedback capacitor 33 at the time t5 is maintained.

The signal PCOR is set to an H level again at a time t7, and the column amplification unit reset switch 35 is turned to a conductive state. Thereby, the output of the differential amplifier 31 is applied to one input node of the input capacitor 32, and both the nodes of the feedback capacitor 33 are reset to an equal potential. Although this potential is ideally set to the base voltage VC0R by the differential amplifier 31 being substantially grounded, in fact, a noise signal VN2 by resetting the differential amplifier 31 is superimposed. Temporarily, an output level of the differential amplifier 31 at this time is set to VC0R+VN2. Since the addition switch 34 is brought into a non-conductive state, a voltage held by the feedback capacitor 33 is maintained also at this time. The noise signal VN2 is a value different from the noise signal VN1. This is because the noise signals VN1 and VN2 are produced by the reset of the column amplification unit 3 performed at different timings. However, since both the noise signals VN1 and VN2 include a common offset component and random component, a difference between the signal levels of both the noise signals VN1 and VN2 correspond to a difference between the random components.

The signal PSEL related to the n-th row is set to an L level at a time t8, and the selection transistor 24 related to the pixel of the n-th row is brought into a non-conductive state. Similarly, the signal PRES related to the n-th row is set to an H level at the time t8, and the reset transistor 23 related to the pixel of the n-th row is turned on. Thus, the pixel signal is not output from the pixel of the n-th row, and the floating diffusion portion FD is reset.

The vertical scanning shift pulse related to (n+1)th row is set to an H level at the time t8. Thereby, the row selection unit 2002 starts control for reading a signal from the pixel of the (n+1)th row.

The signal PRES related to the pixel of the (n+1)th row is set to an L level at a time t9, and the reset of the floating diffusion portion FD is released.

The signal PSEL related to the pixel of the (n+1)th row is set to an H level at the time t9, and the selection transistor 24 of the pixel of the (n+1)th row is turned to a conductive state. Thereby, the source follower circuit is constituted by the amplification transistor 21 and the constant-current source 2, and the pixel signal is output from the pixel of the (n+1)th row. A pixel signal according to the reset of the floating diffusion portion FD or the gate of the amplification transistor 21 is output from the pixel at this time.

The signal PTS is set to an L level at a time t10, and the holding switch 42 is turned off.

The signal PC0R is set to an L level at a time t11, and the column amplification unit reset switch 35 is brought into a non-conductive state. Thereby, a voltage of a difference between VC0R+VN2 and the pixel signal according to the reset of the floating diffusion portion FD of the pixel of the (n+1)th row is held by the input capacitor 32. The output of the column amplification unit 3 varies by the noise signal VN2 based on the base voltage VC0R.

The signals PTN1 and PTN2 are set to an L level at a time t12, and the holding switches 43 and 44 are brought into a non-conductive state. Thereby, the noise signal VN2 caused by releasing the reset of the column amplification unit 3 at the time t11 is held by the holding capacitors 40 and 41. Hereinafter, the noise signal is referred to as a base signal.

The signal PVADD is set to an H level at a time t13, and the addition switch 34 is turned to a conductive state. Thereby, the feedback capacitor 33 is electrically connected to the feedback path of the differential amplifier 31 again, and the output of the column amplification unit 3 is set to a level obtained by superimposing a signal component held by the feedback capacitor 33.

The signal PTX related to the pixel of the (n+1)th row is set to an H level at a time t14 to a time t15, and the electric charges accumulated in the photo diode 20 of the pixel of the (n+1)th row are transferred to the floating diffusion portion FD. Thereby, the level of the pixel signal output from the pixel changes. The pixel signal at this time changes to a signal level obtained by superimposing a level according to an amount of electric charges transferred from the photo diode 20 on a level according to the reset of the floating diffusion portion FD. The output of the column amplification unit 3 also changes with this change. The output of the column amplification unit 3 at this time is set to a level obtained by adding the pixel signal from the pixels of n-th and (n+1)th rows to the noise signal VN2.

If the signal PCH is set to an H level at a time t16, the horizontal transfer switches 46 to 48 are turned to a conductive state, and the signals held by the holding capacitors 40 to 42 are transferred to the horizontal output lines 5 and 6 corresponding to the holding capacitors 40 to 42. The electric charges held by the holding capacitors 40 and 41 are distributed between the capacities of the holding capacitors 40 and 41 and the capacity of the horizontal output line 6, and thereby the signal is transmitted to an output unit 7. Similarly, the electric charges held by the holding capacitor 42 are distributed between the capacity of the holding capacitor 42 and the capacity of the horizontal output line 5, and thereby the signal is transmitted to the output unit 7. As illustrated in FIG. 6, only the holding capacitor 42 is connected to the horizontal output line 5, whereas the holding capacitors 40 and 41 are connected to the horizontal output line 6. Therefore, the signals held by the holding capacitors 40 and 41 have amplitude twice that of the signal held by the holding capacitor 42. The dummy transistor 49 is provided in order to reduce a difference between capacity values between the horizontal output line 6 to which the horizontal transfer switches 46 and 47 are connected and the horizontal output line 5 to which only the horizontal transfer switch 48 is connected. For example, the dummy transistor 49 can be constituted by an MOS transistor having the same size as those of the horizontal transfer switches 46 to 48.

As described above, the noise signals held by the holding capacitors 40 and 41 are based on the release of the reset of the column amplification unit 3 at the time t11. The noise signal is independent of the output of the column amplification unit 3 at the times t3 to t4, and corresponds only to one reset. On the other hand, the voltage held by the holding capacitor 42 is obtained by adding the signals from the two pixels. Therefore, in the present embodiment, the noise signal is held by the two holding capacitors 40 and 41, and thereby the offset component included in the noise signal VN1 can be cancelled. In other words, this is equivalent to applying a twofold gain to the base signal.

Although the noise signal VN2 is held by the holding capacitors 40 and 41 in the present embodiment, the noise signal VN1 is held by the holding capacitors 40 and 41 with the signals PTN1 and PTN2 set to an L level for the times t3 and t4 instead of this, to obtain the same effect.

Although the example in which the signals related to the two pixels are added is illustrated in the present embodiment, the technical concept of the present embodiment can be applied even when the signals related to three or more pixels are added. In the case, the ratio of the capacity values of the holding capacitors may be designed according to the number of the pixels adding the signals.

Figure 8:
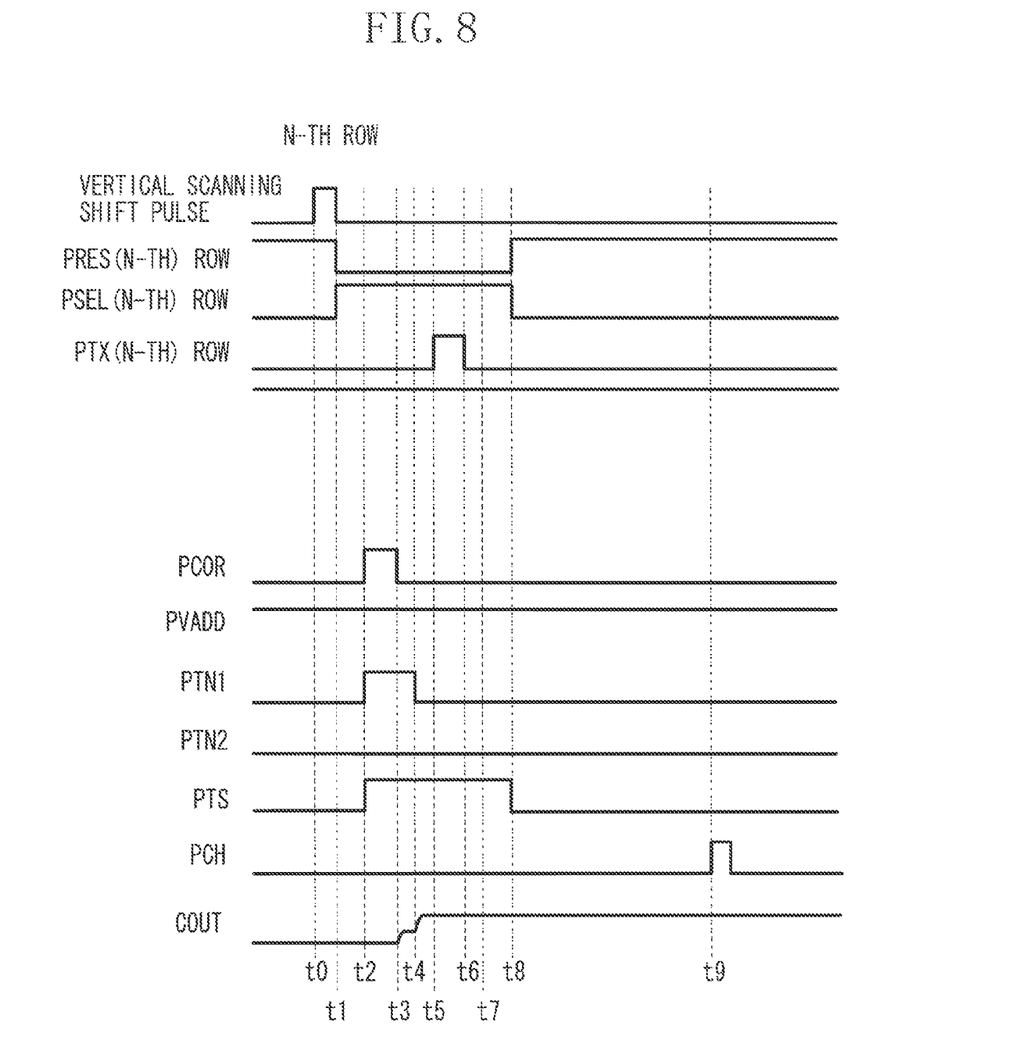
FIG. 8 is a timing diagram illustrating an operation in a non-addition mode of a photoelectric conversion apparatus according to an embodiment.

Next, an operation according to the operation mode (non-addition mode) in which the pixel signal is not added according to the present embodiment will be described.

FIG. 8 is a timing diagram illustrating the operation in the non-addition mode. Points of difference between the operation in the non-addition mode and the operation in the addition mode will be mainly described.

One of differences between the non-addition mode and the addition mode is a point that the signal PVADD is kept at an H level and the addition switch 34 is maintained in a conductive state. along with this, the signal PC0R set to an H level from the time t7 in the addition mode is changed so as to be maintained at an L level. Besides this, the operations of the pixel of the n-th row and the column amplification unit 3 for the period of the times t0 to t8 are the same as those in the addition mode.

The signal holding unit 4 is also different in that the signal PTN2 is maintained at an L level and the output of the column amplification unit 3 is not held by the holding capacitor 41. Furthermore, the reading unit 4 is different in that the noise signal VN2 is held by the holding capacitor 40 by setting the signal PTN1 to an L level at the time t4 and in that the signals based on the electric charges accumulated in the photo diode 20 are held by the holding capacitor 42 by setting the signal PTS to an L level at the time t8.

The signal PCH is set to an H level at the time t9, and thereby the signals held by the holding capacitors 40 and 42 are transmitted to the differential amplifier 7.

Since the signal held by the holding capacitor 42 is based on only the pixel of the n-th row in the non-addition mode, the noise signal is held only by one of the holding capacitors 40 and 41.

The operations of the addition mode and the non-addition mode described above can be mutually switched and executed.

In the present embodiment, the signal holding unit 4, the horizontal output lines 5 and 6, and the differential amplifier 7 can be considered as a signal level adjusting unit. The signal level adjusting unit sets a gain applied to a first signal and a signal added by the column amplification unit 3 in the addition mode so that the first signal is relatively greater than the added signal. When the gain applied to the signal added by the column amplification unit 3 is defined as 1, if the signals of the n (n is an integer of 2 or more) rows are added, an effect of reducing the noise signal is obtained if the gain applied to the first signal is in the range of 1<gain<(2n−1) times. As a result, a decrease in an S/N ratio of the imaging system can be suppressed.

The plurality of reading units 4 provided to correspond to the columns of the pixel array are driven by a common control signal. Since the signal line which transmits the control signal has resistance and a capacity, the resistance and the capacity also increase as the number of the pixel arrays increases. For this reason, it is considered that the waveform of the control signal becomes blunt as it separates from the supply source of the control signal, and the operation timing of the reading unit is deviated depending on the column. When the signals from the plurality of pixels are added by the amplifier, the influence of the deviation of the timing is integrated according to the number of pixels to be added. On the other hand, only one pixel is clamped. Thereby, the influence of the deviation of the timing remains in a signal obtained by subjecting the two signals to differential processing. As a result, shading may occur in a direction along the row in the image to be obtained.

According to the present embodiment, the shading can also be reduced.

A second embodiment will be described.

Figure 9:
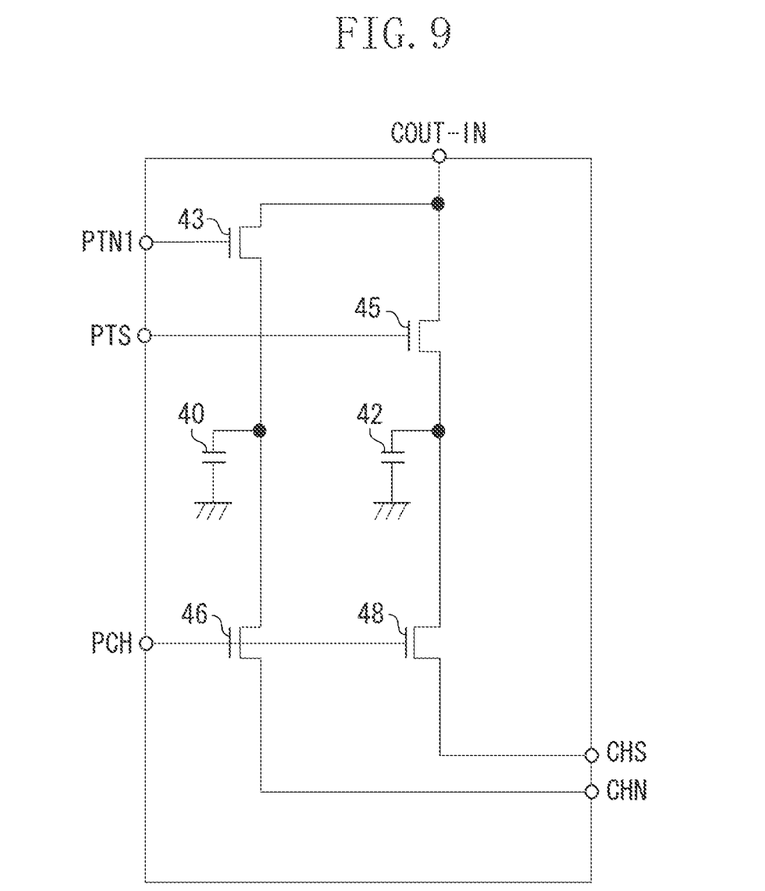
FIG. 9 illustrates a configuration of a photoelectric conversion apparatus according to an embodiment.

A second embodiment will be described with reference to the drawings. FIG. 9 illustrates a configuration of a signal holding unit 4 according to the present embodiment. The second embodiment has the same configuration as that of the first embodiment except for the signal holding unit 4. In FIG. 9, members which are the same as those in FIG. 6 are given the same reference numerals, and accordingly, detailed descriptions thereof are omitted.

Although the case where the signal holding unit 4 has the three holding capacitors 40 to 42 is exemplified in the first embodiment, two holding capacitors are provided in the present embodiment, and one holding capacitor has a capacity twice that of the other holding capacitor. The configuration also can obtain the same effect as that of the first embodiment.

In a photoelectric conversion apparatus operated in an addition mode adding signals from n pixels, a holding capacitor 40 illustrated in FIG. 9 may be designed to have a capacity value which is more than 1 time that of a holding capacitor 42, and is less than (2n−1) times that of the holding capacitor 42.

Also in the present embodiment, a signal level adjusting unit is constituted by a signal holding unit 4, horizontal output lines 5 and 6, and a differential amplifier 7 illustrated in FIG. 3.

When the photoelectric conversion apparatus illustrated in the present embodiment is operated in a non-addition mode, for example, a column amplification unit 3 may have a plurality of feedback capacitors, and a gain of the column amplification unit 3 when a noise signal is output in the non-addition mode is considered to be switched so that the gain of the column amplification unit 3 is smaller than a gain when a signal voltage is output.

Alternatively, as another method, the gains of two signals input into the differential amplifier 7 are considered to be aligned by providing an attenuator configured to attenuate the signal, between the differential amplifier 7 and a horizontal signal line 6, or an amplifier between the differential amplifier 7 and the horizontal signal line 6.

Also in the present embodiment, a decrease in an S/N ratio of an imaging system can be suppressed.

A third embodiment will be described.

Figure 10:
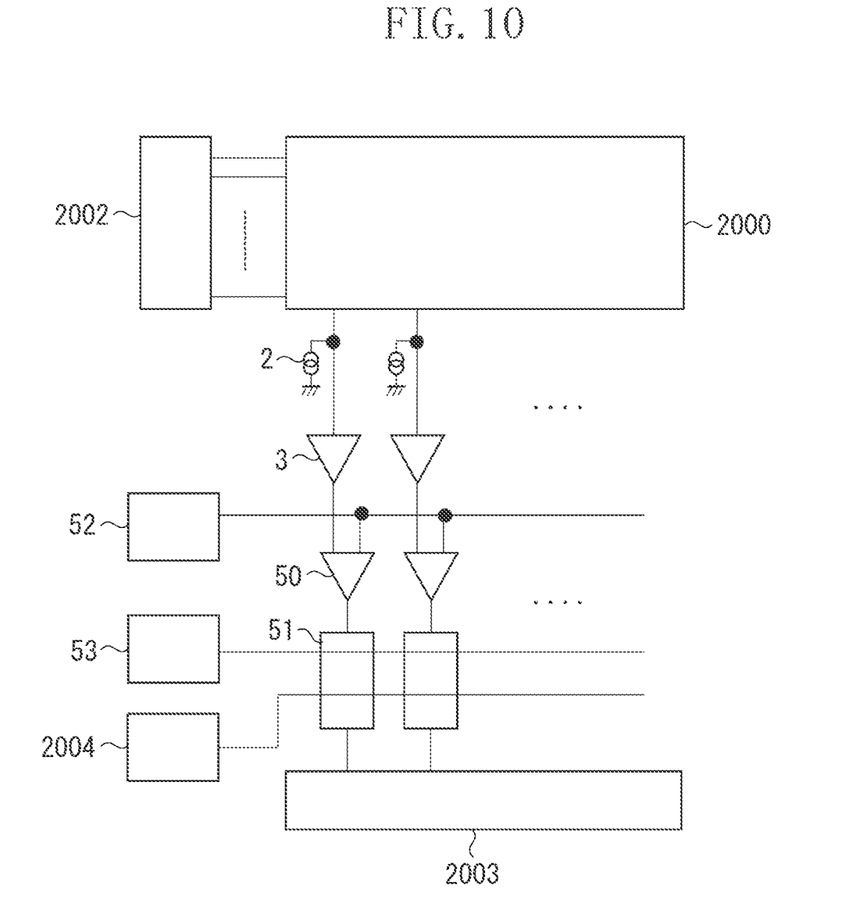
FIG. 10 illustrates a configuration of a photoelectric conversion apparatus according to an embodiment.
Figure 11:
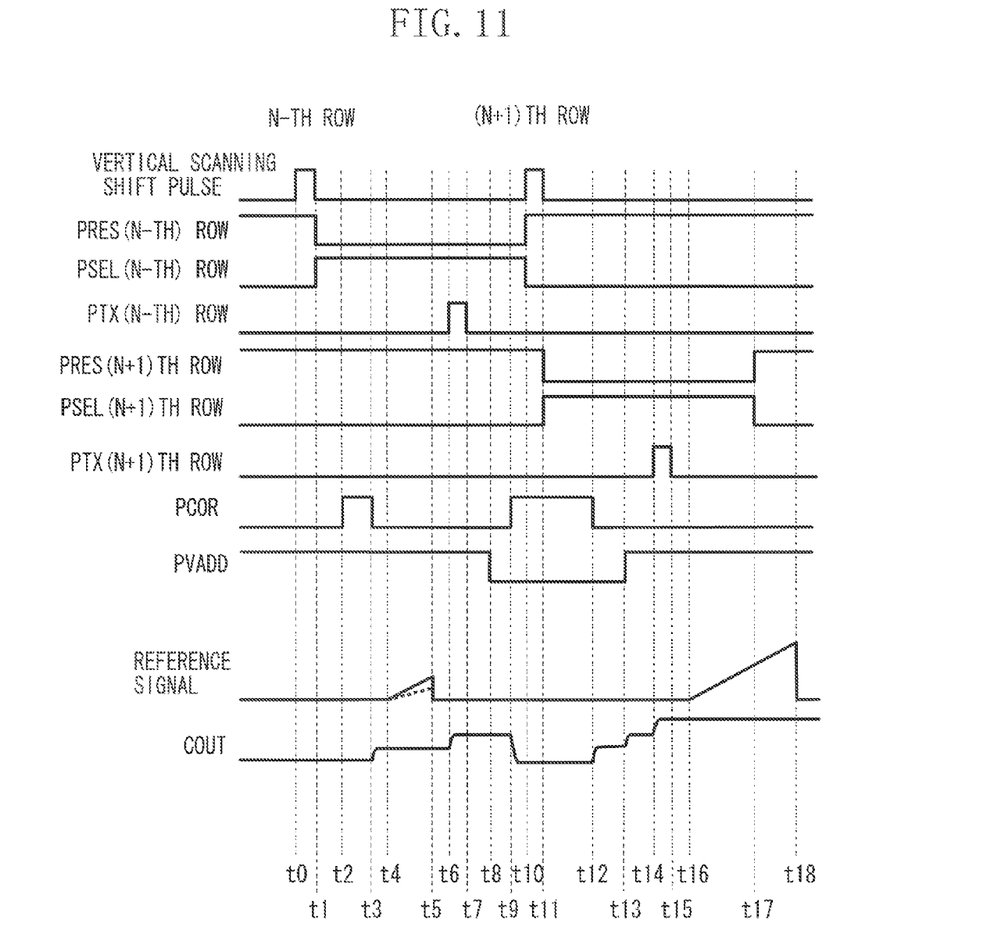
FIG. 11 is a timing diagram illustrating an operation of a photoelectric conversion apparatus according to an embodiment.

A third embodiment will be described with reference to the drawings. FIG. 10 illustrates a configuration of a photoelectric conversion apparatus according to the present embodiment. FIG. 11 is a timing diagram describing an operation according to the present embodiment.

Configurations of a reading unit 2001 and output unit 2004 of the third embodiment are different from those of the photoelectric conversion apparatus illustrated in FIG. 3. In addition, the third embodiment is different in that the photoelectric conversion apparatus includes a base signal generation unit 52 and a counter 53.

The reading unit in the present embodiment includes an AD conversion function configured to convert output of a column amplification unit 3 into a digital signal. Herein, the reading unit includes a comparator 50 and a digital memory 51. An AD conversion unit is constituted by the base signal generation unit 52, the counter 53, and the reading unit. In the first embodiment and the second embodiment, a gain is applied to a noise signal in an analog region. On the other hand, the present embodiment is different from the first embodiment and the second embodiment in that a gain is applied in a digital region.

The output unit 2004 receives the digital signal output from the reading unit 4, and transmits the digital signal to a following stage circuit. The output unit 2004 may include a function configured to change the gain to the input digital signal. The output unit 2004 may have a function configured to perform a difference operation of two signals. A following stage video signal processing circuit unit may have a function configured to perform a difference operation.

An operation in an addition mode of the present embodiment will be described with reference to FIG. 11. The operations of a pixel and column amplification unit 3 are the same as the operations illustrated in FIG. 7, and accordingly, descriptions thereof are omitted. The present embodiment is different in that AD conversion is performed for the period of times t4 to t5 and for the period of times t16 to 18.

At the time t4, a noise signal VN1 is applied to one input node of a comparator, and a base signal is applied to the other input node. At the time t4, a change in a signal level of the base signal applied to the comparator 50 of each column from the base signal generation unit 52 starts. A changing amount of a counted value by the counter 53 until the magnitude relationship between the noise signal VN1 and the base signal is reversed from the time t4 is a digital value corresponding to the noise signal VN1.

On the other hand, at the time t16, signals with which signals related to two pixels are added are applied to one input node of the comparator. The base signal is applied to the other input node. At the time t16, a change in a signal level of the base signal applied to the comparator 50 of each column from the base signal generation unit 52 starts. A changing amount of a counted value by the counter 53 until the magnitude relationship between the added signal and the base signal is reversed from the time t16 is a digital value corresponding to the added signal.

After the digital value obtained by the AD conversion is held by the digital memory 51, the digital value is provided to the output unit 2004.

A signal level adjusting unit in the present embodiment includes the base signal generation unit 52 and the comparator 50. A gain to an analog signal can be increased by decreasing a rate of a change with respect to a time of the base signal. Then, when signals from n pixels are added, a decrease in an S/N ratio can be suppressed by setting a rate (first rate) of a change to the time of the base signal for the period of the times t4 to t6 to be lower than a rate (second rate) of a change to a time of the base signal for the times t16 to t18, for example, setting the first rate to (1/n) times the second rate.

Although the noise signal VN1 related to the pixel of the n-th row is used in the present embodiment, a noise signal VN2 may be used as in the first embodiment and second embodiment. In this case, the AD conversion is performed for the period of times t12 to t13.

When the gradient of the base signal does not change, gains applied to two signals may be switched by using the output unit 2004 as the signal level adjusting unit.

The noise signal VN1 and the signal based on photoelectric conversion may be subjected to the AD conversion using the base signal having the same gradient in the operation in the non-addition mode according to the configuration illustrated in the present embodiment.

Also in the present embodiment, the decrease in the S/N ratio can be suppressed.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2012-223313 filed Oct. 5, 2012, which is hereby incorporated by reference herein in its entirety.

What is claimed is:

1. An imaging system comprising:
a plurality of pixels;
an amplifier including an input node connected to the plurality of pixels via an input capacitor, and an output node connected to the input node via a feedback capacitor;
a reset unit configured to reset the input node to a base potential,
a signal level adjusting unit, and
wherein the imaging system is operative of operating in an addition mode adding signals from the plurality of pixels to the feedback capacitor,
wherein the amplifier is configured to hold a noise output from one of the plurality of pixels in the input capacitor in the addition mode, and thereafter adds the signals output from two or more of the plurality of pixels to the feedback capacitor, and
wherein the signal level adjusting unit is configured to obtain a difference between a signal obtained by applying a gain to a base signal output from the amplifier according to the reset of the input node of the amplifier by the reset unit and a signal added to the feedback capacitor.

2. The imaging system according to claim 1, wherein in a case where the amplifier adds signals output from n (n is an integer of 2 or more) pixels, the gain is a value greater than 1 and less than $(2n-1)$.

3. The imaging system according to claim 1, wherein the signal level adjusting unit includes an AD conversion unit, and
wherein the gain is applied to a digital signal obtained by the AD conversion unit.

4. The imaging system according to claim 3,
wherein the AD conversion unit includes a comparator and a base signal generation unit configured to output a base signal,
wherein the comparator is configured to compare the base signal with a base signal whose signal level changes at a first rate with respect to time in the addition mode, and compare a signal added in the feedback capacitor with a base signal whose signal level changes at a second rate higher than the first rate with respect to time.

5. The imaging system according to claim 1, wherein the imaging system is operative of switching between a non-addition mode in which the signal output from the pixel is not added in the feedback capacitor and the addition mode.

6. A method for driving an imaging system including a plurality of pixels and, an amplifier having an input node connected to the plurality of pixels via an input capacitor, and an output node connected to the input node via a feedback capacitor, the method comprising;
causing the input capacitor to hold noise output from one of the plurality of pixels;
adding signals output from two or more pixels of the plurality of pixels in the feedback capacitor; and
obtaining a difference between a signal obtained by applying a gain to a base signal output from the amplifier according to the reset of the input node of the amplifier to a base potential and a signal added to the feedback capacitor.

7. The method for driving an imaging system according to claim 6, wherein if the amplifier adds signals output from n (n is an integer of 2 or more) pixels, the gain is a value greater than 1 and less than $(2n-1)$.

8. The method for driving an imaging system according to claim 6, further comprising, after converting the base signal into a digital signal, applying the gain to the digital signal.

9. The method for driving an imaging system according to claim 8, wherein the applying the gain is applied by comparing the base signal with a base signal having a signal level changing at a first rate with respect to a time, and
wherein the method further comprising comparing a signal added in the feedback capacitor with a base signal having a signal level changes at a second rate higher than the first rate with respect to the time.

* * * * *